Feb. 7, 1933.  M. MALLORY  1,896,714
IGNITION TIMER
Filed Sept. 28, 1931
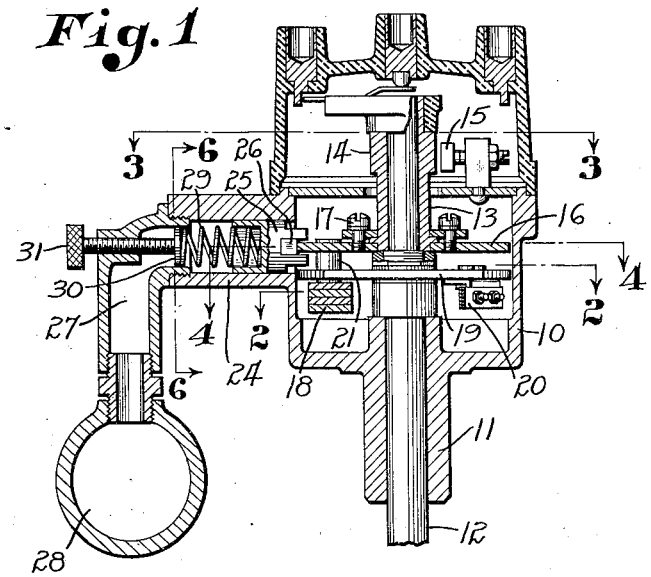
Fig. 1
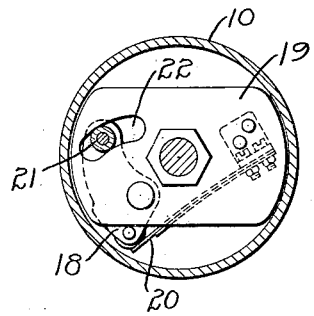
Fig. 2
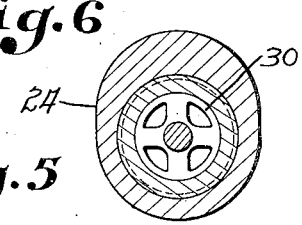
Fig. 6
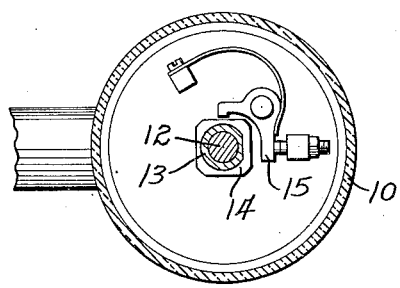
Fig. 3
Fig. 5
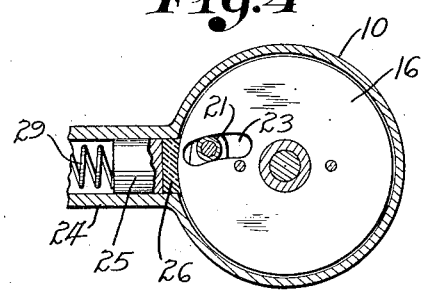
Fig. 4
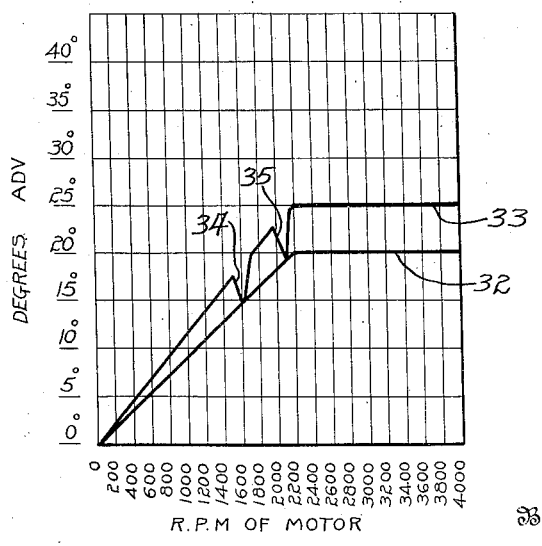
Inventor
Marion Mallory
Owen & Owen
By
Attorneys Patented Feb. 7, 1933

1,896,714

UNITED STATES PATENT OFFICE

MARION MALLORY, OF TOLEDO, OHIO, ASSIGNOR TO THE MALLORY RESEARCH COMPANY, A CORPORATION OF DELAWARE

IGNITION TIMER

Application filed September 28, 1931. Serial No. 565,454.

My invention relates to an ignition timer and particularly to the automatic control of the same to advance or retard the spark in response to certain variations in the operation of the engine and the conditions affecting the same.

It is well known that when the usual centrifugal governor alone is used to advance the timing of the spark in accordance with an increase in speed, the result is not altogether satisfactory, especially when a variable load is imposed upon the engine. For example, suppose an automobile is traveling along a level road with the throttle only partially open. Obviously, the engine will not be receiving a full charge and the compression in the cylinders will be comparatively low. Under such conditions, the spark should be advanced farther than if the engine were operating at the same speed climbing a hill with the throttle wide open, because the wide open throttle would cause the cylinders to receive the maximum charge, thus raising the compression to a maximum, and a high compression calls for a later spark than a low compression at the same speed. If the timing is entirely controlled by a centrifugal governor which depends upon the speed of the engine, it is the same in both cases. The result is that if the timing is set to give the best results under a light load at a given speed, it is too far advanced to give the best results under a heavy load.

Another disadvantage resulting from the control of the timing by the centrifugal governor alone is that when the engine is operating at a low or moderate speed with the spark timed for the best results and the throttle is suddenly opened, the cylinders receive a full charge, raising the compression to a maximum. This causes a spark knock because the spark is advanced too far, until the engine has picked up speed, thus reducing the compression again. On the other hand, if the timing is set back to prevent such knocking, the spark will come too late for normal operating conditions.

With the above difficulties in mind, the object of my invention is to provide means for automatic regulation of the timing in response to variations not only in the speed of the engine but also in the degree of compression in the cylinders as influenced by the volume of fuel mixture supplied at each revolution of the crank shaft. By thus controlling the timing, the expansive force of the ignited fuel is utilized so as to give the best results under all the various conditions of operation.

In the preferred form of my invention, the usual type of speed responsive governor may be used and, in connection therewith, a brake which is actuated to retard the advance of the spark under influence of the governor whenever the fuel charge exceeds a predetermined quantity as compared with the engine speed or whenever the vacuum in the intake manifold is relieved to a predetermined degree. In other words, the spark is retarded whenever the engine is operated under a heavy load or whenever the throttle is suddenly opened.

The present embodiment of my invention will be more particularly described in connection with the accompanying drawing, in which—

Figure 1 is a vertical sectional view of a timer with which the invention is associated;

Figure 2 is a section taken on the line 2—2 of Figure 1;

Figure 3 is a section taken on the line 3—3 of Fig. 1;

Figure 4 is a section taken on the line 4—4 of Fig. 1;

Figure 5 represents diagrammatically the variation in the timing under certain operating conditions, as effected by the present invention and by the usual centrifugal governor; and Figure 6 is a detail sectional view taken on the line 6—6 of Fig. 1.

As shown in the drawing, my invention is associated with an ignition timer comprising a housing 10 formed with a bearing 11 for the timer shaft 12. A sleeve 13 is mounted for relative circumferential movement on the shaft 12 and is provided with a cam 14 which actuates the circuit breaker 15. The relative position of the sleeve 13 and cam 14 with reference to the timer shaft 12 is controlled through the medium of a circular plate 16 which is secured to the sleeve by screws 17 or other suitable means.

The position of the plate 16 is primarily controlled by a suitable centrifugal governor which, in the present instance, includes a weight 18 pivoted to a plate 19 which is secured to the shaft 12. The movement of the weight 18 about its pivot under the influence of centrifugal force is opposed by a spring 20. The weight 18 is provided with a lug 21 which extends through an arcuate slot 22 in the plate 19, thus positively limiting the pivotal movement of the weight. The lug 21 also projects into a curved slot 23 in the plate 16 which is eccentric to the axis of the weight so as to cause an advance movement of the plate 16 and circuit breaker cam 14 as the weight is moved outwardly under the influence of centrifugal force.

In order to modify the effect of the centrifugal governor upon the timer in accordance with the load upon the engine and the amount of compression in the cylinders, the housing 10 is formed with a lateral extension 24, within which a piston 25 is operable. This piston is provided with a brake shoe 26 which is adapted to engage the periphery of the circular disk 16. A conduit 27 connects the piston housing 24 with the intake manifold 28 or some other part of the fuel intake passageway. An expansile coil spring 29 within the housing 24 bears against the piston 25 and has a tendency to hold the brake shoe 26 in contact with the disk 16 to retard the action of the centrifugal governor. This spring also bears against a seat 30 which is preferably provided with a screw adjustment 31 to vary the tension of the spring. It will be noted that the spring seat 30 is of skeleton formation to permit free communication between the passageway 27 and the interior of the housing 24.

In the operation of the timer, if the engine is operating under a comparatively light load, so that the fuel charge is small as compared with the speed of the engine, the vacuum in the manifold 28 will be sufficient to overcome the tension of the spring 29 and withdraw the brake from contact with the disk 16. The time of the spark will then be completely under the control of the centrifugal governor. If, however, the throttle is suddenly opened wide, relieving the vacuum in the manifold 28 and increasing the compression in the cylinders, the brake will immediately engage the disk 16 and retard the spark until the speed of the engine increases in proportion to the amount of fuel supplied.

The advantages of my invention as compared to the control of the timing by the centrifugal governor alone is illustrated by the diagram in Fig. 5 in which the abscissæ indicate the number of revolutions of the engine and the ordinates represent the advance of the spark past dead center. The line 32 represents the timing of the spark as controlled by the centrifugal governor alone. If the car should be traveling, say, at 30 miles per hour with the throttle partially open and the operator should suddenly open the throttle to its fullest extent, the compression in the cylinders would be greatly increased until the engine picks up speed. Assuming that the proper spark advance for high speed is 25°, it would be necessary, in order to prevent excessive spark knock on sudden high compression to limit the maximum advance to 20°. With my invention, however, the proper spark advance is indicated by the line 33. If the car is traveling at moderate speed and the throttle is suddenly opened wider, the governor brake will immediately become effective and cause a retardation of the spark as indicated at 34 until the engine has picked up speed in response to the additional amount of fuel supplied. Again, if the operator wishes to go still faster he can again increase the amount of fuel supplied, again causing the governor brake to retard the spark as indicated at 35. When the car reaches maximum speed in response to this further opening of the throttle, the spark is advanced 25° and all this has been accomplished without any spark knock, whereas with the control by the centrifugal governor alone it would be necessary to limit the maximum spark advance to 20° in order to prevent knocking.

I am aware that various devices have heretofore been proposed for controlling the timing directly in accordance with the degree of vacuum or pressure developed in the intake manifold or the cylinders, and independently of centrifugal action. In such devices, however, an increased vacuum or suction advances the spark and a decreased vacuum or suction retards the spark. The objection to this is that when the engine is running at an extremely high speed with the throttle open, the vacuum is insufficient to advance the spark far enough, and when the engine is idling or running at very low speed with the throttle closed or nearly closed, the vacuum is so great that the spark is advanced too far.

In my timing device, the vacuum does not advance the spark but only releases the friction against the governor, permitting the latter to advance the spark. Consequently, when the engine is idling or operating at low speed, the spark is not effected by the vacuum or even by the centrifugal governor, because the latter will not be expanded. On the other hand, at very high speed, even though the vacuum is decreased sufficiently to allow the brake to engage the rotating member connected with the circuit breaker cam, the spark will not be retarded because at such speed the centrifugal force of the governor is sufficient to overcome the friction imposed by the brake.

It will be understood that the construction of the timer per se and of the centrifugal governor is immaterial to the present invention. In fact, the centrifugal control may be omitted altogether and a spring used to advance the timing except when such advance is prevented by the action of the brake. It will also be understood that the construction of the pneumatically controlled device for applying the brake to retard the timing may be modified considerably without departing from the scope of the invention as defined in the claims.

What I claim is:

1. In an ignition system, a timer shaft, a circuit breaker cam mounted for relative circumferential movement on the shaft, means including a centrifugal governor for advancing the cam, a brake for resisting such advance, and means operable under predetermined conditions to render the brake inoperable.

2. In an ignition system, a timer shaft, a circuit breaker cam mounted for relative circumferential movement on the shaft, means including a centrifugal governor for advancing the cam, a brake for resisting such advance, and means operable by a predetermined degree of vacuum in the intake of the engine to retract the brake to an inoperative position.

3. In an ignition system, a timer shaft, a circuit breaker cam mounted for relative circumferential movement on the shaft, means including a centrifugal governor for advancing the cam, and frictional means actuated upon the occurrence of an increased fuel charge to resist such advance.

4. The combination with an ignition system for internal combustion engines, of primary means tending to advance the time of ignition upon an increase in engine speed, secondary means operable to delay the operation of said primary means, and pneumatically controlled means tending to render said secondary means inoperative as the degree of vacuum in the intake manifold increases.

5. The combination with an ignition system for internal combustion engines, of primary means tending to advance the time of ignition upon an increase in engine speed, secondary means operable to delay the operation of said primary means, and means tending to render said secondary means inoperative as the fuel charge per unit travel is decreased.

6. The combination with an ignition system for internal combustion engines, of means tending to advance the time of ignition upon an increase in engine speed, a brake, a spring urging the brake against said means to retard the advance, and a connection between said brake and the fuel intake of the engine to offer increasing opposition to the action of said spring as the rate of fuel supply in proportion to the speed decreases.

7. The combination with an ignition timer shaft for internal combustion engines, of a member including a circuit breaker cam mounted for relative rotational movement with reference to the shaft, and a brake dependent upon the degree of vacuum in the fuel intake of the engine to retard the rotation of the cam.

8. The combination with an ignition timer shaft for internal combustion engines, of a member including a circuit breaker cam mounted for relative rotational movement with reference to the shaft, means tending to advance the cam, and a brake dependent upon the degree of vacuum in the fuel intake of the engine to retard such advance.

9. The combination with an ignition timer shaft for internal combustion engines, of a circuit breaker cam mounted for relative circumferential movement on the shaft, means for advancing the cam as the speed increases, a brake for resisting such advance, and means operable under predetermined conditions to diminish the effectiveness of the brake.

In testimony whereof I have hereunto signed my name to this specification.

MARION MALLORY.